United States Patent [19]
Chiron et al.

[11] 3,893,109
[45] July 1, 1975

[54] SIMPLIFIED MOVING TARGET DETECTOR

[75] Inventors: Bernard Chiron; Michel Fache, both of Paris, France

[73] Assignee: Societe Lignes Telegraphiques et Telephoniques, Paris, France

[22] Filed: Mar. 28, 1974

[21] Appl. No.: 455,891

[30] Foreign Application Priority Data
Apr. 2, 1973 France .................. 73.11718

[52] U.S. Cl. ................. 343/5 PD; 343/7.7
[51] Int. Cl.² ............................. G01S 9/42
[58] Field of Search .............. 343/5 PD, 7.7

[56] References Cited
UNITED STATES PATENTS
3,611,374  10/1971  Draysey .............. 343/5 PD X
3,750,165  7/1973  Bailey et al. .......... 343/5 PD
3,805,262  4/1974  Klein et al. ........... 343/5 PD
3,832,709  8/1974  Klein et al. ........... 343/5 PD

*Primary Examiner*—T. H. Tubbesing
*Attorney, Agent, or Firm*—Kemon, Palmer & Estabrook

[57] ABSTRACT

A simplified moving target detector consists of a doppler type equipment comprising a transistorized microwave source feeding a diode frequency multiplier. The same diode acts as a mixer for the reflected wave. The diode is of the variable capacitance type connected to suitable stripline stubs and feeds a low frequency output filter tuned in the doppler shift range.

4 Claims, 4 Drawing Figures

3,893,109
Prior Art     Fig. 1
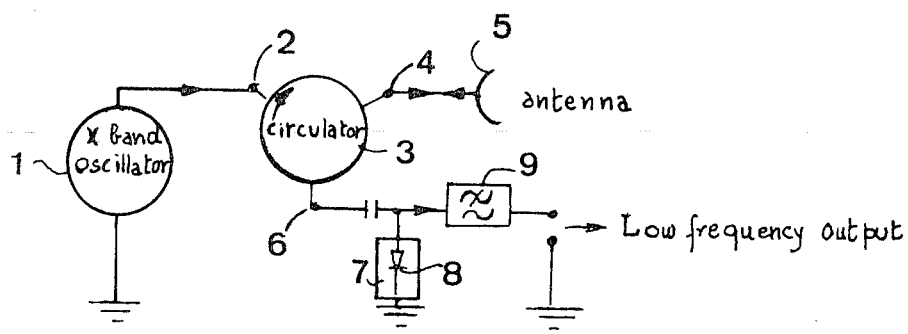
Fig. 2
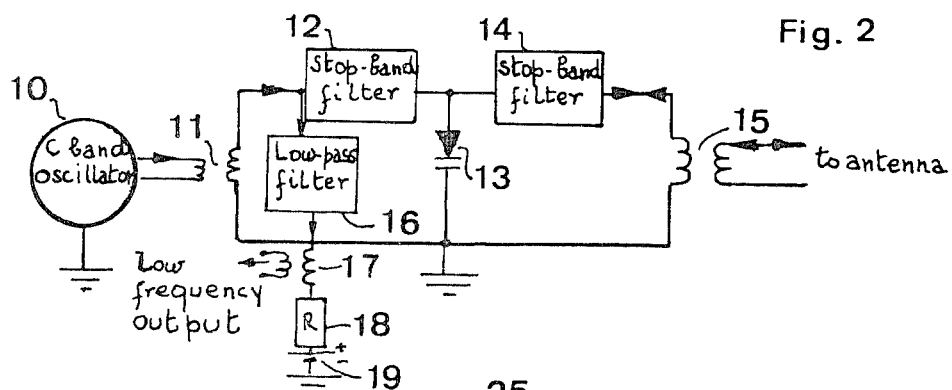
Fig. 3
Fig. 4
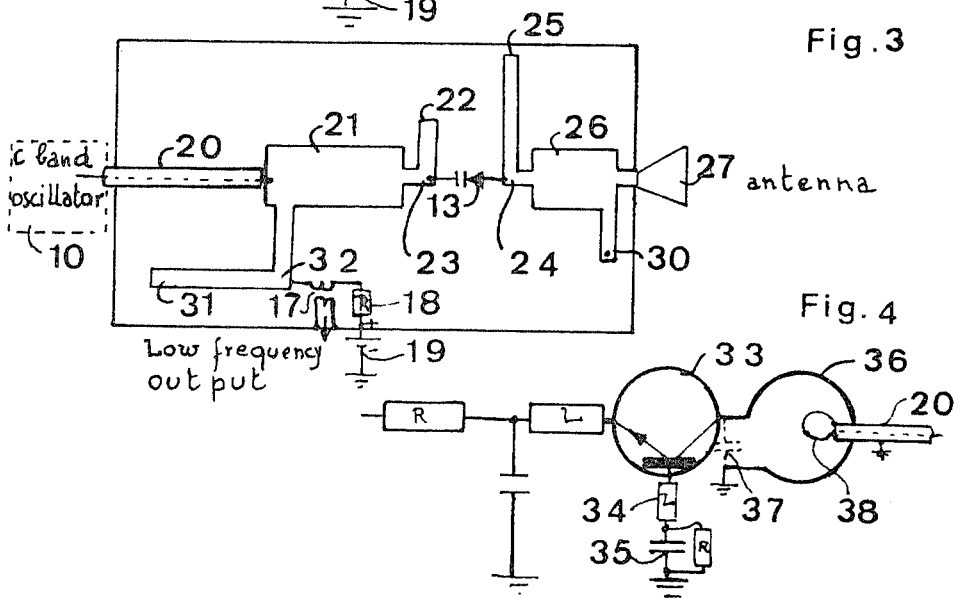

SIMPLIFIED MOVING TARGET DETECTOR

BACKGROUND OF THE INVENTION

The invention concerns a short-range radar equipment with continuous transmission, which is intended to detect the existence of a target moving in relation to the radar equipment.

Electromagnetic detection of moving objects, is currently obtained by causing a small fraction of the transmitted wave to be mixed, in an appropriate cavity, with the echo from the moving object. The frequency of the reflected wave is shifted by the amount $\delta f$ due to the Doppler-Fizeau effect with respect to the transmitted wave frequency $f$.

British Pat. No. 1,279,583, assigned to MULLARD LTD., discloses an example of this type of arrangement. In FIG. 1 of this patent, which is reproduced here as FIG. 1, the Gunn diode oscillator 1 generates a wave, for example at 10 GHz, which is applied at port 2 of a circulator 3 and circulates through the latter so as to leave by port 4 connected to an antenna 5. After reflection from a moving object, the reflected wave collected by antenna 5 has a slightly different frequency. After passing through circulator 3, the reflected wave reaches port 6 which feeds a mixer 7 made of a Schottky diode 8. Mixer 7 also receives a fraction of the transmitted wave, which beats with the reflected wave. The result of the mixing, the frequency of which is between 10 and 100 Hz, is fed through low-pass filter 9 to the load circuit.

Gunn effect diodes have the disadvantage that their mean time between failures is lower than that of semiconductors of other types, which are also less costly.

The object of the present invention is to provide a design having excellent reliability while of economical construction.

BRIEF DISCLOSURE OF THE INVENTION

The simplified Doppler radar equipment according to the invention comprises at least (1) one transistorised microwave source and (2) one frequency multiplier and mixer stage made of a single diode, with non-linear capacitance as a function of the reverse voltage. Said diode is connected on the one hand to the said microwave source and to a transmit-receive antenna, and on the other hand to a low-frequency filter tuned to the range of the Doppler frequencies.

The use of a single diode in accordance with the essential feature of the invention for simultaneously providing frequency multiplication and mixing affords the following advantages: simplicity, economy and excellent reliability. Designing a transistorised source oscillating between 1 and 5 GHz which has an efficiency of more than 20 % is quite easy. Frequency multiplying by 2 or 3 is a high yield operation, so that the overall efficiency is greater than the 3 % ratio which can be obtained from a Gunn diode oscillating above 10 GHz.

The mean time between failures of microwave transistors is in the neighborhood of one hundred thousand hours. The value is very similar in the case of Schottky silicon diodes of the variable-capacitance type.

The arrangement readily lends itself to production in the form of an hybrid microwave integrated circuit. Therefore, it has low bulk and can be mass produced at a fairly low cost.

DETAILED DESCRIPTION OF THE INVENTION

Further features and advantages of the invention will become apparent from the description illustrated by FIGS. 2 to 4, which are given by way of illustration and have no limiting character, and in which:

FIG. 1 is a simplified showing of a Doppler radar apparatus of the prior art,

FIG. 2 is a functional diagram illustrating the basis of the invention,

FIG. 3 is a diagrammatic view of the hybrid integrated microwave circuit constituting the frequency multiplier and mixer stage according to the invention, and FIG. 4 is a circuit diagram of the microwave source used for the simplified Doppler equipment according to the invention.

In FIG. 2, the transistorised microwave source 10 supplies a continuous wave at frequency $f_o$. Said source feeds an impedance transformer 11 in series with a narrow-band filter 12. A diode 13 having a non-linear capacitance as a function of the applied reverse voltage is connected between the output of the filter 12 and earth. It is known (Varactor Handbook — published by Sylvania, P.10) that the arrangement performs the frequency multiplication with high efficiency when, among other conditions, the diode is so chosen that the minimum capacitance of the junction $C_j$ at applied bias voltage $v_o$ is related to the input frequency $f_o$ by the relation, in MKS units, $(C_j)_{v_o} = 10^{-3}/f_o$, and that the cut-off frequency at the bias voltage $v_o$ is at least equal to ten times the output frequency $nf_o$. The diode 13 may be, for example, a variable-capacitance diode of the type PHRI 909 marketed by Parametric Industries in the United States, or any equivalent. Alternatively, it may be a Schottky barrier diode, or a point-contact diode. A filter 14 which is tuned at frequency $f_o$ is connected between the point common to the diode and to the filter 12 and the input of a transformer 15 whose secondary winding is connected to a transmit-receive antenna (not shown).

A low-frequency filter 16 connects the common point of the transformer 11 and of the filter 12 to the primary winding of a low-frequency output transformer 17 in series with the biasing supply of the diode 13, which is shown as resistor 18 and battery 19. As well known the diode is reverse biased.

The circuit operates as follows: taking into account the impedance of the diode 13 and the filter 12 in series in the secondary winding of the transformer 11, the latter has in its primary winding a real impedance whose value is matched to the output of the microwave source. Filter 12, which is tuned at the frequency $nf_o$, prevents propagation of this wave towards the microwave source, so that the frequency $f_o$ remains stable. The impedance transformer 15 matches the impedance of the antenna to that of the diode 13 for the frequency $nf_o$, while the filter 14, which is tuned at frequency $f_o$, prevents the propagation of the wave at the frequency $f_o$ to the antenna.

After reflection from an target which is moving in relation to the antenna, the echo picked up has a frequency $nf_o + \delta f$. The minimum detectable value of $\delta f$ is set by the performance of the low-frequency receiver connected to the output transformer 17. The upper limit is fixed by the maximum speed of the moving objects from which the echoes can be produced, that is to say, for land moving targets below $10^4$ Hz. In practice, the bandwidth of filter 14 is sufficient, without any special steps, for the frequency wave $nf_o + \delta f$ to pass through filter 14 without attenuation.

The condition relating to the minimum capacitance of the junction $(C_j')_{ro}$ of a variable-capacitance diode used as a mixer between a strong local wave of frequency $nf_o$ and a low-level wave of frequency $nf_o + \delta f$ is $(C_j')_{ro} = 10^{-3}/nf_o$. It has been seen in the foregoing that the capacitance of the junction is at least equal to $10^{-3}/f_o$ in order that the frequency multiplication may be possible. The condition that the cut-off frequency must be more than ten times the frequency of the local oscillator $nf_o$ is already satisfied. The break down voltage requirement does not involve any further condition by reason of the fact that the level of the frequency wave $nf_o + \delta f$ is negligible as compared with the level of the local wave. Experience shows that the beat between the local wave of frequency $nf_o$ and a reflected wave of a level which is lower by about 20 db occurs under good conditions, in the case of diodes of the types already mentioned, as soon as the level of the local wave is equal to or higher than about 20 milliwatts. Various beat frequencies appear, the filter 16 supplying transformer 12 only with the wave of frequency $\delta f$.

In FIG. 3, the microwave source 10 is represented by a dashed-lined square. The connection between the source and the frequency multiplying and mixing stage 13 may be made, for example, by means of a capacitive probe at the end of a coaxial line having an impedance of 50 ohms as shown at 20. This coaxial line is connected to an impedance transformer 21 designed as a microstrip line corresponding to the transformer 11 of FIG. 2.

For the sake of clarity, it is assumed that the embodiment described by way of non-limiting, illustrative example corresponds to the case where the diode multiplies the frequency by two. There corresponds to the frequency $f_o$ of the oscillator a wavelength $\lambda o$ in the microstrip line. The length given to 22, perpendicularly to the general direction of the design, measured from the point 23 at which it connects the electrode of 13, is equal to $\lambda o/8$. The diode 13 is also connected at point 24 to a microstrip line 25 of a length equal to $\lambda o/4$ and to a transformer 26 tuned to the frequency $2f_o$, which matches the impedance of the antenna 27 to that of the diode 13, corresponding to the transformer 15 of FIG. 2. This transformer is connected to the general earth by a length of microstrip line 30 equal to $\lambda o/8$. In addition, a length of microstrip line 31 equal to $\lambda o/8$, designed parallel to the general direction of the arrangement, is connected at 32 to the primary winding of the low-frequency transformer 17 in series with the bias circuit.

The frequency multiplier and mixer stage operates as follows: the coupling of the microwave source to the capacitive probe 20 enables the wave at the frequency $f_o$ to reach the diode 13. The stub 25 maintains the point 24 at earth potential for a wave of frequency $f_o$ owing to the fact that its length is equal to $\lambda o/4$ and owing the absence of any connection at the end opposite to 24. On the other hand, the line section 26 is tuned at $2f_o$. 22 constitutes an open-circuit quarter-wave trap for the wave of $2f_o$, which is reflected from the point 23. The element 30 having a length equal to a quarter-wave for the wave at frequency $2f_o$ makes it possible to close the direct bias circuit of the diode without interfering with the propagation of the wave of frequency $2f_o$ as far as the antenna. The use of a diode having a non-linear capacitance as a function of the applied voltage in conjunction with a sufficient power level at the frequency $f_o$ ensures that the arrangement has an excellent conversion efficiency. In the described example, the microwave source supplies a power of 80 milliwatts at 5 GHz and the power at 10 GHz is higher than 30 milliwatts, these values are typical.

When the reflected wave of frequency 10 GHz $+ \delta f$ arrives, the elements 27 and 26 direct it to the diode 13, where mixing occurs. Of all the frequencies produced, only two can pass through the transformer 21. These are the waves of frequencies $\delta f$ and $2f_o + \delta f$ which are not trapped by 22 and 31. The function of the trap 22 is to prevent the wave of frequency $2f_o + \delta f$ from entering the output circuit, while the wave of frequency $\delta f$ can leave freely by way of the transformer 17, whose transformation ratio is high since its impedance at the frequency $\delta f$ is higher than 100 K$\Omega$.

Experience has shown that a loss of Doppler conversion of 20 db can be obtained.

It is obvious that it is possible without departing from the scope of the invention to effect a frequency multiplication by another ratio. For this purpose, it is sufficient, as is well known, to design the length of line 22 equal to a quarter of the wavelength corresponding to the multiplied frequency and to design the transformer 26 with a length which enables it to match the impedances of the diode and of the antenna at this same frequency. It is also possible without departing from the scope of the invention to replace the elements of the hybrid integrated microwave circuit by equivalent components produced by another technology.

FIG. 4 illustrates the microwave source. It comprises a transistor 33, for example of the type HP21 marketed by Hewlett-packard, Palo Alto, United States, whose maximum oscillation frequency is 12 GHz. The base of the transistor 33 is connected to an inductor 34 of value inductance L in series with a capacitor 35 of capacitance C, one end of which is earthed. The collector of the transistor 33 is connected to earth by an inductor 36 of value L'. The capacitance C' of the collector of the transistor 33 in relation to earth is indicated in dashed lines at 37 in FIG. 4. The microwave source and the frequency multiplier and mixer stage are coupled by the capacitive probe 20, but it is alternatively possible to employ a coupling loop instead of an antenna for terminating the coaxial line, as illustrated at 38 in FIG. 4. The microwave source operates as follows. The inductance 34 and the capacitance 35 are tuned at a frequency $f_o$ such that $f_o^2 = 1/4\pi^2 LC$. In addition, L' is chosen as a function of C' in order to satisfy the condition $f_o^2 = 1/4\pi^2 L'C'$.

By way of non-limiting example, with the transistor HP21 already mentioned, a power of 80 milliwatts can readily be obtained at the frequency $f_o = 5$ GHz.

What we claim is:

1. A short range moving target detector based on Doppler effect comprising:
  a. a transistor generator which operates at frequency $f_o$;
  b. a semiconductor diode mixer and frequency multiplier with a ratio $n$;
  c. a first coupling element between said generator and said mixer and frequency multiplier with a low impedance at $f_o$ and a high impedance at $nf_o$;

d. a second coupling element between said mixer and frequency multiplier and a transmit-receive antenna with a low impedance at $nf_o$;

e. a low-pass filter between said mixer and frequency multiplier and a load for applying the difference frequency signal between the transmit and received signals.

2. A short range moving target detector according to claim 1 in which said mixer and frequency multiplier is a variable capacitance reversely biased diode.

3. A short range moving target detector according to claim 1 in which said mixer and frequency multiplier is a Schottky diode.

4. A short range moving target detector according to claim 1 formed as a microwave integrated circuit in which said coupling elements are microstrip stubs tuned respectively at $nf_o$ and $f_o$.

* * * * *

UNITED STATES PATENT OFFICE
CERTIFICATE OF CORRECTION

PATENT NO. : 3,893,109
DATED : July 1, 1975
INVENTOR(S) : Bernard Chiron et al

It is certified that error appears in the above-identified patent and that said Letters Patent are hereby corrected as shown below:

In column 3, line 65, before "2 $f_o$" insert --frequency--

Signed and Sealed this twenty-fifth Day of November 1975

[SEAL]

Attest:

RUTH C. MASON
Attesting Officer

C. MARSHALL DANN
Commissioner of Patents and Trademarks